(12) United States Patent
Evans et al.

(10) Patent No.: US 8,706,634 B2
(45) Date of Patent: Apr. 22, 2014

(54) METHODS AND SYSTEMS FOR BIOMETRIC VERIFICATION (71) Applicant: MasterCard International Incorporated, Purchase, NY (US)

(72) Inventors: Paul Michael Evans, Hampshire (GB); Jim Gopinathan, Oxford (GB)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 13/967,825

(22) Filed: Aug. 15, 2013

(65) Prior Publication Data

US 2013/0332365 A1 Dec. 12, 2013

Related U.S. Application Data (63) Continuation of application No. 12/340,990, filed on Dec. 22, 2008.

(51) Int. Cl.
*G06Q 40/00* (2012.01)

(52) U.S. Cl.
USPC ............................................. 705/44; 340/5.82

(58) Field of Classification Search
USPC ............................................. 705/44; 340/5.82
See application file for complete search history.

(56) References Cited

U.S. PATENT DOCUMENTS

| 5,623,552 | A  | 4/1997  | Lane |
| 5,815,252 | A  | 9/1998  | Price-Francis |
| 5,987,155 | A  | 11/1999 | Dunn et al. |
| 6,011,858 | A  | 1/2000  | Stock et al. |
| 6,351,817 | B1 | 2/2002  | Flyntz |
| 6,389,542 | B1 | 5/2002  | Flyntz |
| 6,643,783 | B2 | 11/2003 | Flyntz |
| 6,695,205 | B1 | 2/2004  | Lundstrom et al. |
| 6,907,134 | B1 | 6/2005  | Yamada et al. |
| 6,983,882 | B2 | 1/2006  | Cassone |
| 7,070,112 | B2 | 7/2006  | Beenau et al. |
| 7,103,575 | B1 | 9/2006  | Linehan |
| 7,155,416 | B2 | 12/2006 | Shatford |
| 7,274,807 | B2 | 9/2007  | Hillhouse et al. |
| 7,287,165 | B2 | 10/2007 | Aono et al. |
| 7,314,164 | B2 | 1/2008  | Bonalle et al. |
| 7,516,884 | B2 | 4/2009  | Chase-Salerno et al. |
| 7,597,250 | B2 | 10/2009 | Finn |
| 7,599,847 | B2 | 10/2009 | Block et al. |
| 7,647,505 | B2 | 1/2010  | Yudasaka |
| 7,765,162 | B2 | 7/2010  | Binder et al. |
| 7,849,501 | B2 | 12/2010 | Vishik et al. |
| 2001/0048025 | A1 | 12/2001 | Shinn |
| 2002/0143626 | A1 | 10/2002 | Voltmer et al. |
| 2002/0147924 | A1 | 10/2002 | Flyntz |
| 2002/0178086 | A1 | 11/2002 | Margeson et al. |
| 2002/0188509 | A1 | 12/2002 | Ariff et al. |
| 2002/0194068 | A1 | 12/2002 | Bishop et al. |

(Continued)

*Primary Examiner* — Kenneth Bartley
(74) *Attorney, Agent, or Firm* — Buckley, Maschoff & Talwalker LLC (57) ABSTRACT

Methods, systems and apparatus for verifying a cardholder during a transaction involving a payment device and a terminal are provided. In some embodiments, the payment device transmits a first biometric information template to a terminal, receives a first sample template, determines that a match occurs between the first sample template and a first biometric reference template, and determines that a verification sequence applies to the transaction requiring satisfaction of a second biometric rule. In an implementation, the payment device then transmits a second biometric information template, receives a second sample template, determines that a match occurs between the second sample template and a second biometric reference template, and transmits a verification status of the cardholder.

19 Claims, 4 Drawing Sheets

(56) References Cited

U.S. PATENT DOCUMENTS

| | | |
|---|---|---|
| 2003/0046247 A1 | 3/2003 | Stiasny |
| 2003/0050900 A1 | 3/2003 | Kuraishi |
| 2003/0055689 A1 | 3/2003 | Block et al. |
| 2003/0115490 A1 | 6/2003 | Russo et al. |
| 2003/0223624 A1 | 12/2003 | Hamid |
| 2003/0223625 A1 | 12/2003 | Hillhouse et al. |
| 2004/0019790 A1 | 1/2004 | Aono et al. |
| 2004/0024670 A1 | 2/2004 | Valenzuela et al. |
| 2004/0044627 A1 | 3/2004 | Russell et al. |
| 2004/0059923 A1 | 3/2004 | ShamRao |
| 2004/0064453 A1 | 4/2004 | Ruiz et al. |
| 2004/0122774 A1 | 6/2004 | Studd et al. |
| 2004/0133582 A1 | 7/2004 | Howard et al. |
| 2004/0188519 A1 | 9/2004 | Cassone |
| 2004/0230535 A1 | 11/2004 | Binder et al. |
| 2004/0238621 A1 | 12/2004 | Beenau et al. |
| 2005/0001711 A1 | 1/2005 | Doughty et al. |
| 2005/0033688 A1 | 2/2005 | Peart et al. |
| 2005/0137977 A1 | 6/2005 | Wankmueller |
| 2005/0150947 A1 | 7/2005 | Goodman et al. |
| 2005/0187883 A1 | 8/2005 | Bishop et al. |
| 2005/0194452 A1 | 9/2005 | Nordentoft et al. |
| 2005/0212657 A1 | 9/2005 | Simon |
| 2005/0218215 A1 | 10/2005 | Lauden |
| 2006/0000891 A1 | 1/2006 | Bonalle et al. |
| 2006/0047971 A1 | 3/2006 | Miyazaki et al. |
| 2006/0095369 A1 | 5/2006 | Hofi |
| 2006/0129838 A1 | 6/2006 | Chen et al. |
| 2006/0138245 A1 | 6/2006 | Lee |
| 2006/0143117 A1 | 6/2006 | Chigira et al. |
| 2006/0151599 A1 | 7/2006 | Awatsu et al. |
| 2006/0224504 A1 | 10/2006 | Nwosu et al. |
| 2007/0052517 A1 | 3/2007 | Bishop et al. |
| 2007/0226512 A1 | 9/2007 | Kevenaar et al. |
| 2007/0228154 A1 | 10/2007 | Tran |
| 2007/0260883 A1 | 11/2007 | Giobbi et al. |
| 2008/0041942 A1 | 2/2008 | Aissa |
| 2008/0201264 A1 | 8/2008 | Brown et al. |
| 2008/0281740 A1 | 11/2008 | Wu |
| 2008/0298646 A1 | 12/2008 | Wennergren |
| 2009/0127328 A1 | 5/2009 | Aissa |
| 2009/0150994 A1 | 6/2009 | Evans |
| 2009/0307139 A1 | 12/2009 | Mardikar et al. |
| 2010/0051688 A1 | 3/2010 | Imaizumi et al. |
| 2010/0085150 A1 | 4/2010 | Aikawa et al. |
| 2010/0131414 A1 | 5/2010 | Tame |
| 2010/0135542 A1 | 6/2010 | Keepper, Jr. et al. |
| 2010/0161488 A1 | 6/2010 | Evans et al. |
| 2011/0022425 A1 | 1/2011 | Block et al. |
| 2011/0057034 A1 | 3/2011 | Maxwell |
| 2011/0179284 A1 | 7/2011 | Suzuki et al. |

METHODS AND SYSTEMS FOR BIOMETRIC VERIFICATION

CROSS-REFERENCE TO RELATED APPLICATION

This application claims the benefit of U.S. patent application Ser. No. 12/340,990 filed on Dec. 22, 2008, which is incorporated herein by reference.

BACKGROUND

The use of biometric techniques to authenticate payment transactions and verify the identity of payment device holders is increasing. Biometric techniques that are promoted for this use include voice, fingerprint, iris, vein pattern and other scans. Currently, the type of biometric to be captured for a given transaction is determined by the biometric terminal in use at a transaction location. Further, the transaction terminal also controls what steps are to be taken in the event of an authentication failure. Payment device issuers have little (if any) control over the authentication process to be used.

It would be desirable to allow payment (or other information carrying) device issuers to have greater control over the biometric authentication process. It would further be desirable to allow issuers to control the type and level of biometric authentication required for transactions, and how verification failures are to be handled.

DETAILED DESCRIPTION

Embodiments of the present invention relate to systems, methods, processes, computer program code, and means for biometric verification. Pursuant to some embodiments, a biometric verification rules table is stored on a transaction device (such as a payment card or other information device having an integrated circuit chip and memory). The biometric verification rules table is created by an issuer of the device (or an agent of the issuer) and is stored on the transaction device in a personalization process or by updating a memory of the transaction device. The biometric verification rules table specifies the level (and type) of biometric authentication required by transactions involving the transaction device. Pursuant to some embodiments, biometric authentication may be controlled and carried out in off-line transactions (e.g., without need for a terminal which is in remote communication with the issuer).

In some embodiments, a reader is operated to verify the identity of a cardholder during a transaction, including receiving a biometric information template from the transaction device, prompting the cardholder to present a required biometric feature for reading by the reader, the required biometric feature determined based on information in the biometric information template, reading the required biometric feature to create a sample set of biometric data, transmitting the sample set of biometric data to the transaction device, and receiving a response from the transaction device, the response including at least one of a success code, a further biometric information template, and a failure code.

Embodiments of the present invention allow an issuer of a transaction device to specify the level of biometric authentication required, as well as to define alternative biometric and other authentication steps in the event of authentication failure. Further, pursuant to some embodiments, issuers may enforce multiple biometric verification requirements as part of a single transaction. The result is a system which puts control of the authentication process in the hand of the issuer and which ensures that biometric authentication may be used in locations (and for transactions) where the communications infrastructure is unreliable or unavailable.

A number of terms are used herein to describe features of some embodiments of the present invention. For example, as used herein, the term "transaction device" is used to refer to a portable device which includes one or more integrated circuit ("IC") chips and which stores information (such as payment information, personal information, or the like) that may be used in conjunction with transactions (such as payment transactions). Pursuant to some embodiments, a "transaction device" may be a contact or a contactless device capable of communication with a reader device using wireless communication techniques. For example, a transaction device may be an information-carrying device that is compliant with one or more of: ISO/IEC 14443 Standard, ISO/IEC 18000 standard, the NFC standards including ISO/IEC 18092/ECMA 340 and ISO/IEC 21481/ECMA 352, and other standards such as the EMV standards (available at www.emvco.com) and the "PayPass" standards promulgated by MasterCard International Incorporated.

For illustration, and to describe features of some embodiments, a particular transaction device will be used as an example herein—a payment device compliant with the ISO/IEC 14443 Standard, the EMV standards, and the "PayPass" standards (e.g., a contactless payment card will be used as an illustrative example of a particular "transaction device" throughout this disclosure). Those skilled in the art will appreciate, upon reading the present disclosure, that similar techniques may be used for other transaction devices.

As used herein, the term "issuer" is used to refer to an entity (or an agent of the entity) that "issues" or distributes transaction devices configured pursuant to embodiments of the present invention. For example, in the context of a transaction device used for payment transactions, the issuer may be the financial institution that holds a payment account associated with the transaction device and that holds an account relationship with the customer (referred to herein as a "cardholder") the transaction device was issued to. In general, "issuers" are concerned with ensuring that the identities of cardholders are properly verified during transactions involving their transaction cards. Embodiments of the present invention allow issuers to control the biometric techniques used to verify cardholders during transactions involving devices issued by the issuer.

As used herein, the term "biometric" or "biometrics" is used to refer to scans or digital representations (or "samples") of physical features associated with a cardholder that are to be verified during a transaction. The physical features can include voice, fingerprint, iris, vein pattern or the like. As used herein, feature data from a biometric sample may be extracted to select features of interest. Extracted biometric feature data is referred to herein as a "template".

As used herein, the term "cardholder verification method" (or "CVM") is used to refer to a selected method to verify a cardholder during a transaction involving a transaction device configured pursuant to embodiments of the present invention. A CVM may be, for example, a biometric verification, password verification, or the like.

Features of embodiments of the present invention will now be described by first referring to FIG. 1, which is a block diagram depicting a system 100 configured pursuant to some embodiments.

Figure 1:
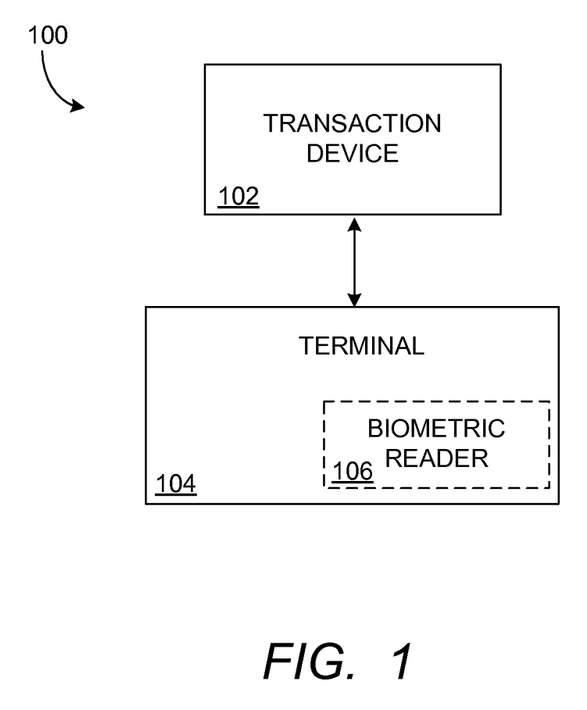
FIG. 1 is a block diagram depicting a system configured pursuant to some embodiments.

As shown in FIG. 1 a system 100 includes a transaction device 102 in communication with a terminal 104. The terminal 104 includes a biometric reader 106. The transaction device 102 may be any of a number of different types of portable devices having one or more IC chips which are configured to support biometric verification pursuant to the present invention. For the purpose of illustrating features of the present invention, the transaction device 102 will be described as a contactless payment card which is configured to operate in accordance with the EMV specifications as well as the PayPass specifications introduced above. The terminal 104 is, for example, a point of sale terminal configured to operate in accordance with the EMV specifications and may include a contactless reader configured to interact with transaction device 102. Pursuant to some embodiments, the terminal 104 need not be in constant communication with a remote processing center; instead, pursuant to some embodiments, the terminal 104 may interact with the transaction device 102 in an "off line" manner as will be described herein. Those skilled in the art will appreciate that terminals which are in communication with a remote processing center during all (or part of) a transaction (e.g., are "online" transactions) may also be used pursuant to the present invention.

According to some embodiments, a cardholder may present the transaction device 102 to the terminal 104 to conduct a transaction (such as a payment transaction). In many situations, an issuer of the transaction device 102 may wish to enforce one or more cardholder verification rules to ensure that the person presenting the transaction device 102 in the transaction is an authorized holder of the transaction device. In previous systems, cardholder verification was performed using personal identification numbers (or "PINs") or other methods. It is desirable, in some situations, to require that a biometric feature of the cardholder be verified to prior to conducting certain transactions. Embodiments of the present invention allow biometric verification to be performed in a manner specified by an issuer of the transaction device 102.

While further details regarding the biometric verification will be provided below, a brief overview will illustrate certain features of the present invention. In a typical transaction pursuant to the present invention, a person presents transaction device 102 at terminal 104 to conduct a transaction. The terminal 104 and the transaction device 102 interact with an initial communications handshake in which the transaction device 102 and the terminal 104 establish a communications session. The exact nature of the communications handshake may vary depending on the communications standard used (e.g., the communications handshake may follow the communications protocol established by the EMV specifications, for example).

Once communication has been established, and the terminal 104 and transaction device 102 identify each other as supporting biometric verification processing, the terminal 104 requests a biometric information template (or "BIT") from the transaction device 102. The transaction device 102 returns a BIT, and the terminal 104 uses the details in the BIT to prompt the cardholder to present a required biometric feature to the biometric reader 106 for reading (e.g., if the BIT specifies that the cardholder's fingerprint from their right index finger be obtained, the terminal 104 prompts the cardholder to present his or her right index finger to a the biometric reader 106 for scanning). The terminal 104 obtains and processes the sample to create a template (as will be described further below) and returns the sample to the transaction device 102. The transaction device 102 compares the received sample with a stored template. If the biometric sample matches the stored template, a success message may be returned to the terminal indicating that the cardholder has been successfully verified. The transaction may then be completed as normal (e.g., a payment transaction may be completed, following the normal authorization rules of the payment system).

Pursuant to some embodiments, as will be described further below, the verification may require the capture of additional biometric information as defined by the issuer of the transaction device 102. Pursuant to embodiments of the present invention, issuers are able to specify the verification sequence by storing verification rules in the transaction device 102. The transaction device 102 follows the rules and is responsible for issuing a verification success or failure message upon completion of those rules. The result is a system and method that allows issuers to control the cardholder verification process even in situations where the transaction device 102 is used in off-line environments (e.g., where the terminal 104 is not in communication with the issuer or other processing center). Unlike previous biometric verification systems, the verification process and success/failure criteria is controlled by rules in the transaction device 102, not by rules and criteria stored in the terminal device 104 or remote processing centers.

Figure 2:
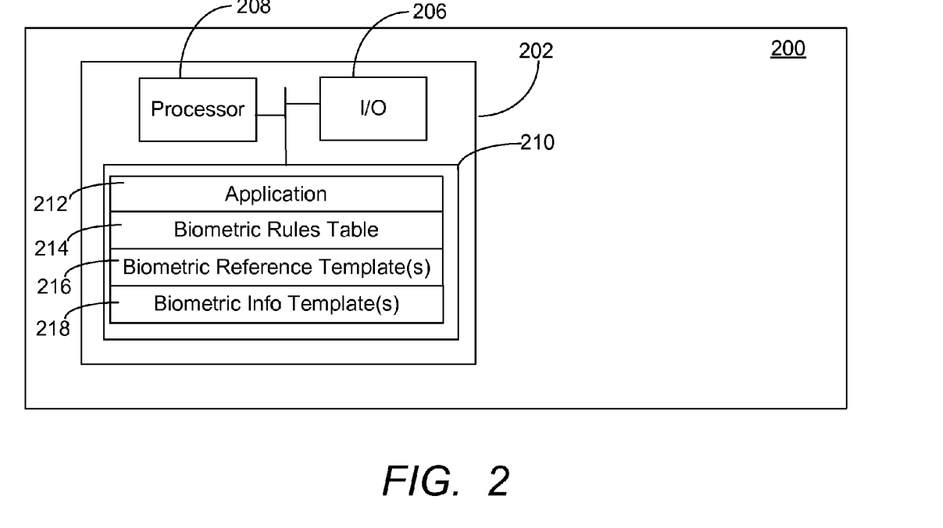
FIG. 2 is a block diagram depicting a transaction device configured pursuant to some embodiments.

Reference is now made to FIG. 2 which is a block diagram depicting a transaction device 200 (such as the transaction device 102 of FIG. 1) configured pursuant to some embodiments. In some embodiments, transaction device 200 may be formed as a card-shaped device (e.g., such as a credit card size device compliant with ISO Standard 7816). The device may be formed in other shapes as well. For example, the device may be shaped as a small format card and inserted in a mobile telephone or other device.

Pursuant to some embodiments, the transaction device 200 has one or more IC chips 202 embedded therein. The IC chip 202 includes a processor portion 208, an I/O portion 206, and one or more memory portions 210. The I/O portion 206 may include a plurality of electrical contacts (in the case where the transaction device 200 communicates with terminals via contacts) and/or one or more antennas (in the case where the transaction device 200 communicates with terminals via radio frequency communication). In some embodiments, a transaction device 200 may have both contactless and contact communication capabilities and may include both a plurality of contacts and one or more antennas. Those skilled in the art will recognize that IC chip 202 may include other components (not shown) such as control logic, timers or the like as is known in the art.

The memory portion 210 may include different forms or types of memory, including, for example, read-only memory, non-volatile memory and programmable memory as is known in the art. As shown, the memory portion 210 stores a number of data items for use in performing biometric verification pursuant to some embodiments. Those skilled in the art will appreciate that the memory portion 210 may store additional data elements and applications (not shown) to enable the transaction device 200 to interact with terminal devices and to perform transactions.

As shown, the memory portion 210 stores application data 212, one or more biometric rules tables 214, one or more biometric reference templates ("BRTs") 216, and one or more biometric information templates ("BITs") 218. The application data 212 includes program instructions that, when executed by the processor 208, cause the processor to execute a biometric verification process pursuant to embodiments of the present invention.

The biometric rules tables 214 stores data (e.g., loaded into the memory by an issuer of the transaction device 200) used to control the biometric verification of the cardholder. For example, the biometric rules table 214 may include the following data: a field containing one or more biometric rule numbers (uniquely identifying each biometric rule associated with the transaction device and the cardholder), a field containing one or more BIT reference numbers (each referring to a particular biometric information template stored in the memory), a field containing data identifying an action (or actions) to be taken should the biometric verification be successful (e.g., the data may specify either that an additional biometric rule number be processed, or that the cardholder is successfully verified), a field containing data identifying an action (or actions) to be taken should the biometric verification fail (e.g., the data may specify that another rule be processed or that the verification transaction be failed), and a field containing data identifying a number of retries that may be attempted should the verification fail.

Each of these data elements are used in conjunction with the application 212 to perform biometric verification processing pursuant to embodiments of the present invention. Examples of verification rules will be provided further below in conjunction with a description of FIG. 4. In general, the biometric verification rules table 210 and related data are used to allow issuers of a transaction device 200 to control the authentication process during a transaction involving the transaction device 200.

For example, use of the biometric verification rules table allows the issuer to control, using rules stored in the transaction device 200, how many retries to allow for each biometric sample (e.g. the card holder could be allowed to submit their left index fingerprint up to three times within a transaction), what to do in the event of a successful verification (e.g., the issuer could decide to approve the transaction, or the issuer could decide that more biometric samples are required, for example, the issuer may decide that the card holder needs to successfully submit their left index fingerprint and their right index fingerprint before the transaction is approved), and what to do in the event of a failed verification (e.g., the issuer could deny the transaction, or the issuer could allow the card holder to submit an alternative biometric. For example, the issuer may decide that the card holder needs to submit either their left middle fingerprint or their right middle fingerprint.). Pursuant to some embodiments, the issuer defines the level of biometric authentication required for a transaction. The issuer may also choose to use a combination of different types of biometrics, for example iris scan and fingerprint.

The transaction card 200 may store a number of different combinations and types of biometric rules, as will be illustrated below. In one embodiment, a biometric verification rules table may specify a single biometric rule and template (e.g., as shown below in TABLE 1).

TABLE 1

| RULE | BIT No. | SUCCESS | FAILURE | RETRIES |
|------|---------|---------|---------|---------|
| R1   | B1      | SUCCESS | FAILED  | 4       |

In some embodiments, the transaction device 200 may store several biometric verification rules in the biometric rules table 214. For example, as shown in TABLE 2, two biometric information templates 218 and rules are provided. As an example, the rules may be constructed such that if the first rule is failed (as discussed further below), then the second rule must be attempted to successfully verify the cardholder. As a specific example, the first rule could apply a template (B1) representing the cardholder's left index finger fingerprint, while the second rule could apply a template (B2) representing the cardholder's right index finger fingerprint. Successful verification of either template would result in verification of the cardholder using this scheme.

TABLE 2

| RULE | BIT No. | SUCCESS | FAILURE | RETRIES |
|------|---------|---------|---------|---------|
| R1   | B1      | SUCCESS | R2      | 3       |
| R2   | B2      | SUCCESS | FAILED  | 3       |

In some embodiments, the biometric verification rules table 214 in a transaction device 200 may require that more than one biometric template be verified. As an example, as shown in TABLE 3, two biometric information templates may be provided, and the rules may specify that both templates must be matched for the verification to be successful.

TABLE 3

| RULE | BIT No. | SUCCESS | FAILURE | RETRIES |
|------|---------|---------|---------|---------|
| R1   | B1      | R2      | FAILED  | 4       |
| R2   | B2      | SUCCESS | FAILED  | 2       |

In some embodiments, biometric verification rules may be established which require that more than one, but not all, of the biometric information templates be matched for a successful verification. As an example, shown in TABLE 4, four biometric information templates may be provided, and the biometric verification rules table 214 may specify that two out of the four templates must be matched for the verification to be successful.

TABLE 4

| RULE | BIT No. | SUCCESS | FAILURE | RETRIES |
|------|---------|---------|---------|---------|
| R1   | B1      | R2      | R3      | 4       |
| R2   | B2      | SUCCESS | R3      | 4       |
| R3   | B3      | R4      | FAILED  | 4       |
| R4   | B4      | SUCCESS | FAILED  | 4       |

The biometric information templates and biometric reference templates may be created using an industry standard format (e.g., such as ISO Standard 19092). The samples taken from the cardholder may be taken prior to, or in conjunction with a personalization process performed by the issuer (or an agent of the issuer) during issuance of the card. In some embodiments, the samples may be taken from the cardholder at a later time, and transmitted to, and stored in, a memory of the transaction device 200.

Figure 3:
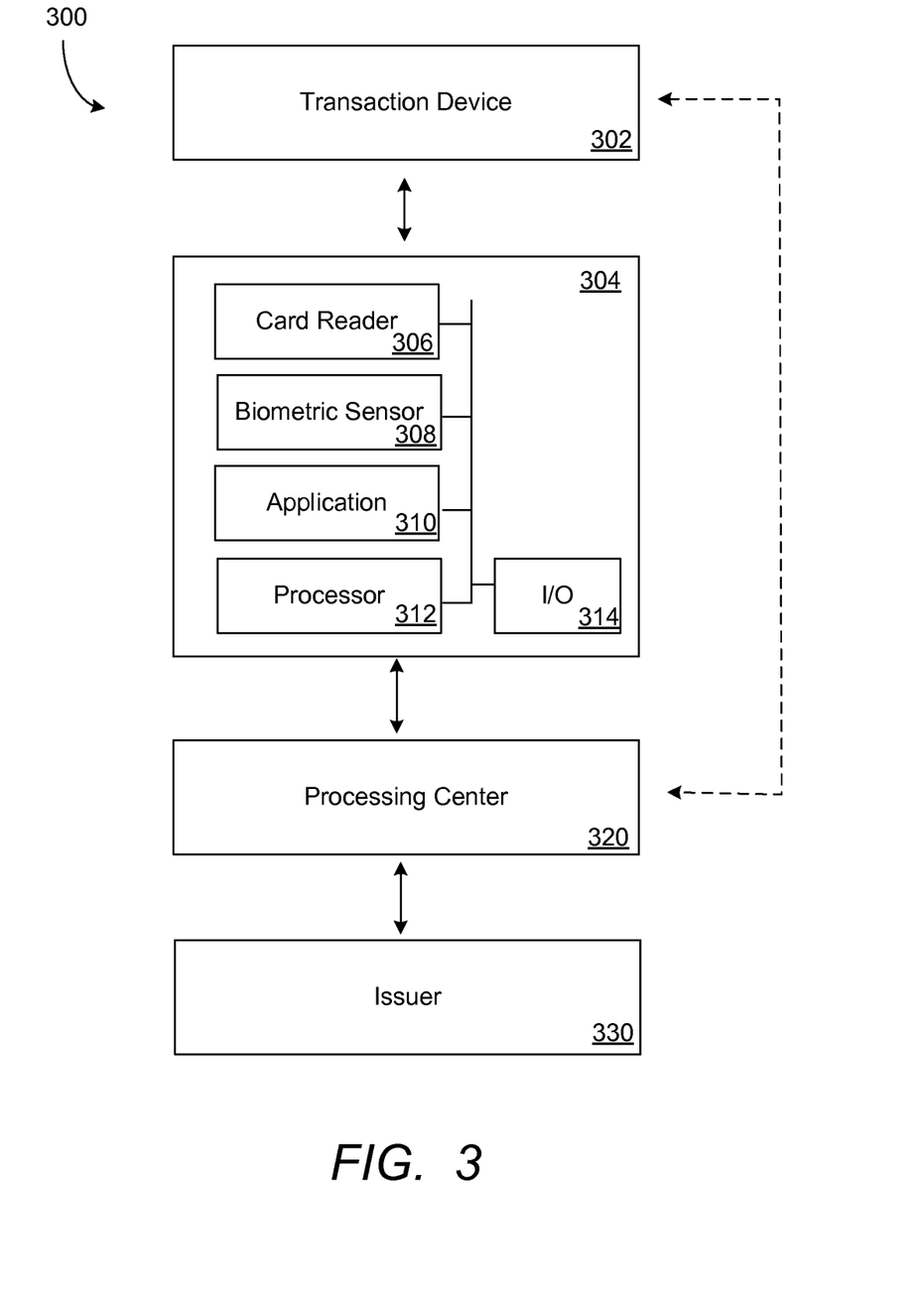
FIG. 3 is a block diagram depicting a transaction system configured pursuant to some embodiments.

Reference is now made to FIG. 3, which is a block diagram depicting a transaction system 300 configured pursuant to some embodiments. In a typical transaction environment involving cardholder verification pursuant to the present invention, a transaction system 300 includes a number of entities, including a transaction device 302 (e.g., such as the transaction device 200 described above in conjunction with FIG. 2), a terminal device 304, a processing center 320, and an issuer 330. Those skilled in the art will appreciate that a system will include any number of transaction devices 302, terminal devices 304, and issuers 330. One or more processing centers 320 may also be involved.

In embodiments in which features of the present invention are used to perform cardholder verification for payment card transactions, the terminal device 304 may be a point of sale terminal deployed, for example, at a merchant or sales location, and used to facilitate the sales of goods or services. The terminal device 304 may be in communication (either intermittently or on a regular basis) with one or more processing centers 320 to authorize and transmit payment information to issuers 330 to facilitate the clearing and settlement of transactions. In some embodiments, the processing center 320 is or includes a payment network (such as the network operated by MasterCard International Incorporated). Some or all of the systems or entities may be in communication over networks such as the Internet, or private or secure networks.

As shown, the terminal device 304 may include a number of components to allow interaction with a transaction device 302. For example, the terminal device 304 may include a card reader 306 (e.g., such as a contact or contactless reader), a biometric sensor 308 (e.g., such as a fingerprint reader, an iris scanner, a signature reader, a handprint scanner, or the like), a program or application 310 (e.g., including, for example, an application to allow communication with transaction device 302), a processor 312 and an input/output device 314 (e.g., to allow communication with other devices including, for example, a processing center 320). Those skilled in the art will appreciate that a wide range of different types of terminal devices 304 may be used. For example, a terminal device 304 may be a typical point-of-sale terminal, a terminal embedded or installed in a vending machine, a passport or other information device processing terminal, or the like.

Figure 4:
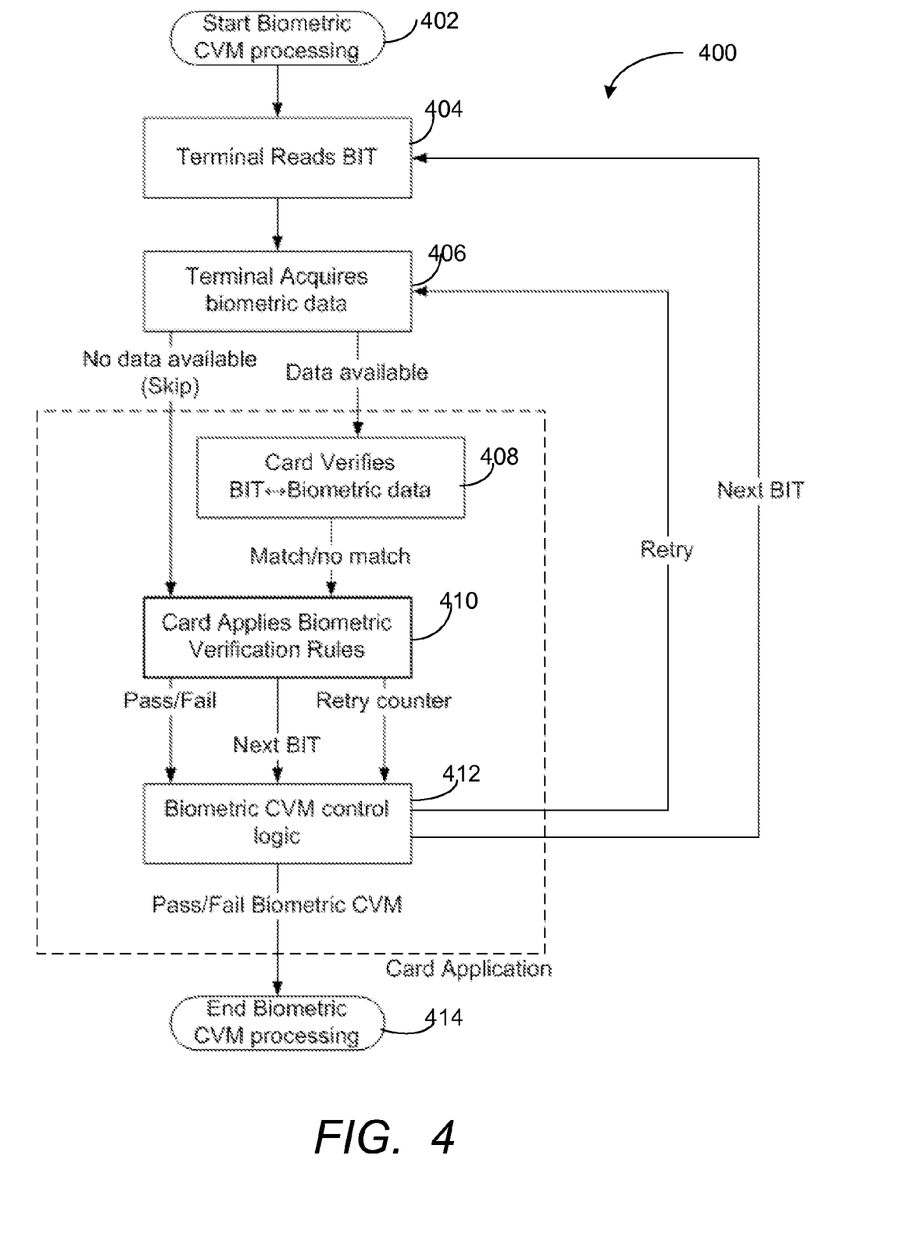
FIG. 4 is a flow diagram depicting a verification process pursuant to some embodiments.

Further detail regarding a verification process pursuant to some embodiments will now be provided by reference to FIG. 4, which is a flow diagram depicting a verification process 400 pursuant to some embodiments. The verification process 400 may be performed by a transaction device (such as the device 200 of FIG. 2) in interaction with a terminal device (such as the device 304 of FIG. 3) during a transaction. The process 400 may be performed after initial communications between a transaction device and a terminal device have been completed (e.g., after an initial handshake process has occurred).

Processing begins at 402 where, for example, an application stored in the terminal device determines that biometric cardholder verification processing is required. Processing continues at 404 where the terminal device reads a biometric information template ("BIT") from the transaction device. The selection of the BIT to be provided to the terminal device is, for example, determined by the biometric verification rules stored in the transaction device (e.g., in the biometric verification rules table, such as table 214 of FIG. 2). For example, the transaction card may begin with the first biometric verification rule stored in the card, and cause the BIT associated with the first biometric verification rule to be transmitted to the terminal.

The BIT specifies the nature of the biometric sample to be collected by the terminal. Processing continues at 406 where the terminal collects the required biometric data. This may be performed, for example, by generating a prompt to the cardholder, instructing the cardholder to present the required biometric feature for reading. If the BIT read at 404, for example, requires a left index finger fingerprint, then the terminal may prompt the cardholder to present their left index finger fingerprint to a fingerprint reader to collect the sample. If the terminal is unable to collect or read the required feature, processing continues to 410. If the terminal is able to collect the required feature, processing continues at 408 as the terminal converts the sampled feature into a sample template (e.g., in accordance with a standard format such as the format specified by ISO Standard 19092) and transmits the sampled data in a sample template to the transaction card.

At 408, the transaction card processes the sample template from the terminal by comparing the biometric reference template associated with the current BIT to the sample template. Processing continues at 410 where the transaction card applies the biometric verification rules in the biometric verification rules table to the results of 408. If the sample template matches the biometric reference template, then the transaction card application examines the "success" column of the biometric verification rules table. If the "success" column indicates that another rule must be performed, then the application moves to the new rule in the table, and the process returns to 404. If the "success" column indicates that the verification should be considered successful based on the BIT verification, then the transaction card returns a "SUCCESS" message to the terminal and verification is complete.

If the sample template does not match the biometric reference template, then the transaction device application examines the "retries" column of the rules table to determine whether the transaction should "FAIL" or if a retry is available. If a retry is available, the retry counter is decremented, and processing reverts to step 406, and the same BIT is applied. If the retry counter has been exhausted, then the transaction device will examine the "failed" column of the biometric verification rules table. If another rule is available and should be followed, then the transaction device will retrieve the next rule and it's associated BIT and processing reverts to step 404. The process continues until a final "SUCCESS" or "FAIL" is reached.

In the embodiments described above, a fixed mode of operation specified by the biometric verification rules table is followed, and all of the matching is determined by an application stored on the transaction device 200. In some embodiments, a transaction device may randomly choose rules from the biometric verification rules table. In such embodiments, the transaction device 200 may be configured with additional parameters which define the number of rules which must be passed for authentication to succeed and the maximum number of failed rules before authentication is considered to be a failure.

In this embodiment, the transaction device randomly selects rules from the biometric verification rules table. If verification is successful then the transaction device increments a success counter. If the count is equal to the number of successful verifications required then the transaction device considers the authentication as successful. If more successes are required then the transaction device picks another rule at random.

In the case of a failed verification, the transaction device increments a failed counter if the number of retries has been exhausted or the verification is skipped. If the failed count is greater than a maximum number of failures allowed then the transaction device considers the authentication as failed. If more failures are allowed then the transaction device selects another rule at random.

In a further embodiment, transaction devices may be deployed without biometric reference data stored thereon (e.g., the cardholder's biometric reference data is not loaded onto the transaction device). In such embodiments, the transaction device may only store the biometric verification rules table. The biometric verification rules table may be read by the terminal during transactions and the terminal may use the data from the table to directly perform the required authentications.

The above descriptions of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
    storing, by a payment device in a memory, a biometric rules table, a plurality of biometric information templates, and a plurality of biometric reference templates provided by an issuer financial institution, wherein the biometric rules table comprises a plurality of rules, each of the plurality of biometric information templates specifies a biometric feature, and each of the plurality of biometric reference templates represents a digital representation of a physical feature of a cardholder associated with the payment device;
    transmitting, by the payment device to a terminal device during a payment transaction, a first biometric information template based on a first biometric rule of the biometric rules table;
    receiving, by the payment device from the terminal device, a first sample template and information about the payment transaction;
    determining, by the payment device, that the first sample template matches a first biometric reference template;
    determining, by the payment device that a verification sequence applies to the payment transaction that requires satisfaction of at least a second biometric rule of the biometric rules table to verify an identity of the cardholder;
    transmitting, by the payment device to the terminal device, a second biometric information template associated with the second biometric rule;
    receiving, by the payment device from the terminal device, a second sample template;
    determining, by the payment device, that the second sample template matches a second biometric reference template; and
    transmitting, by the payment device to the terminal device, a verification status of the cardholder.

2. The method of claim 1, wherein the verification sequence comprises a plurality of verification rules, wherein each verification rule comprises an associated action to be taken when verification is successful, and data identifying a number of retries to be taken when verification is unsuccessful.

3. The method of claim 2, wherein the verification sequence comprises a predetermined sequence of verification rules specified by the issuer financial institution.

4. The method of claim 2, wherein the verification sequence comprises a random sequence of verification rules chosen from the biometric rules table by an application of the payment device.

5. The method of claim 1, wherein the verification status of the cardholder comprises a success code, and further comprising receiving, by the payment device from the terminal device, a payment account information request.

6. The method of claim 1, further comprising, prior to transmitting the first biometric information template:
    receiving, by the payment device from the issuer financial institution, an updated biometric rules table; and
    storing, by the payment device, the updated biometric rules table in the memory.

7. The method of claim 1, further comprising, subsequent to receiving the first sample template from the terminal device:
    determining, by the payment device, that the first sample template does not match the first biometric reference template;
    determining, by the payment device based on the biometric rules table, that at least one retry is permitted; and
    retransmitting, by the payment device to the terminal device during the payment transaction, the first biometric information template.

8. The method of claim 7, further comprising, after determining that the first sample template does not match the first biometric reference template:
    determining, by the payment device based on the biometric rules table, that a retry is not permitted; and
    transmitting, by the payment device to the terminal device, a failure code.

9. The method of claim 1, further comprising, subsequent to determining that the first sample template matches the first biometric reference template:
    determining, by the payment device that the verification sequence for the payment transaction does not require satisfaction of a second biometric rule of the biometric rules table to verify the identity of the cardholder; and
    transmitting, by the payment device to the terminal device, a success code.

10. The method of claim 1, further comprising, subsequent to receiving the second sample template from the terminal device:
    determining, by the payment device, that the second sample template does not match the second biometric reference template;
    determining, by the payment device based on the biometric rules table, that at least one retry is permitted; and
    retransmitting, by the payment device to the terminal device during the payment transaction, the second biometric information template.

11. The method of claim 10, further comprising, after determining that the second sample template does not match the second biometric reference template:
    determining, by the payment device based on the biometric rules table, that a retry is not permitted; and
    transmitting, by the payment device to the terminal device, a failure code.

12. The method of claim 1, wherein the first biometric information template is associated with a first biometric feature that is different from a second biometric feature associated with the second biometric information template.

13. A payment device comprising:
    a processor;
    an input/output device coupled to the processor; and
    a memory in communication with the processor, the memory storing a biometric rules table, a plurality of biometric information templates, a plurality of biometric reference templates, and a verification sequence required to verify an identity of a cardholder, wherein each of the plurality of biometric information templates specifies a biometric feature, and each of the plurality of biometric reference templates represents a digital representation of a physical feature of the cardholder, wherein the memory also stores instructions configured to cause the processor to:
- transmit to a terminal device during a payment transaction, a first biometric information template based on a first biometric rule of the biometric rules table;
- receive a first sample template from the terminal device and information about the payment transaction;
- determine that the first sample template matches a first biometric reference template;
- determine that the verification sequence for the payment transaction requires satisfaction of at least a second biometric rule of the biometric rules table to verify the identity of the cardholder;
- transmit to the terminal device, a second biometric information template associated with the second biometric rule;
- receive a second sample template from the terminal device;
- determine that the second sample template matches a second biometric reference template; and
- transmit a verification status of the cardholder to the terminal device.

14. The payment device of claim 13, the memory storing further instructions configured to cause the processor, prior to transmitting the first biometric information template, to:
- receive an updated biometric rules table from the issuer financial institution; and
- store the updated biometric rules table in the memory.

15. The payment device of claim 13, the memory storing further instructions configured to cause the processor, subsequent to receiving the first sample template from the terminal device, to:
- determine that the first sample template does not match the first biometric reference template;
- determine, based on the biometric rules table, that at least one retry is permitted; and
- retransmit the first biometric information template to the terminal device during the payment transaction.

16. The payment device of claim 15, the memory storing further instructions configured to cause the processor, subsequent to determining that the first sample template does not match the first biometric reference template, to:
- determine that a retry is not permitted; and
- transmit a failure code to the terminal device.

17. The payment device of claim 13, the memory storing further instructions configured to cause the processor, subsequent to determining that the first sample template matches the first biometric reference template, to:
- determine that the verification sequence for the payment transaction does not require satisfaction of a second biometric rule of the biometric rules table to verify the identity of the cardholder; and
- transmit a success code to the terminal device.

18. The payment device of claim 13, the memory storing further instructions configured to cause the processor, subsequent to receiving the second sample template from the terminal device, to:
- determine that the second sample template does not match the second biometric reference template;
- determine based on the biometric rules table, that at least one retry is permitted; and
- retransmit the second biometric information template to the terminal device during the payment transaction.

19. The payment device of claim 18, the memory storing further instructions configured to cause the processor, after determining that the second sample template does not match the second biometric reference template:
- determine that a retry is not permitted; and
- transmit a failure code to the terminal device.

* * * * *